Dec. 28, 1948. J. A. VAN DEN AKKER 2,457,788
FILM EXTENSIBILITY TESTING METHOD AND APPARATUS
Filed Sept. 29, 1945 3 Sheets-Sheet 1
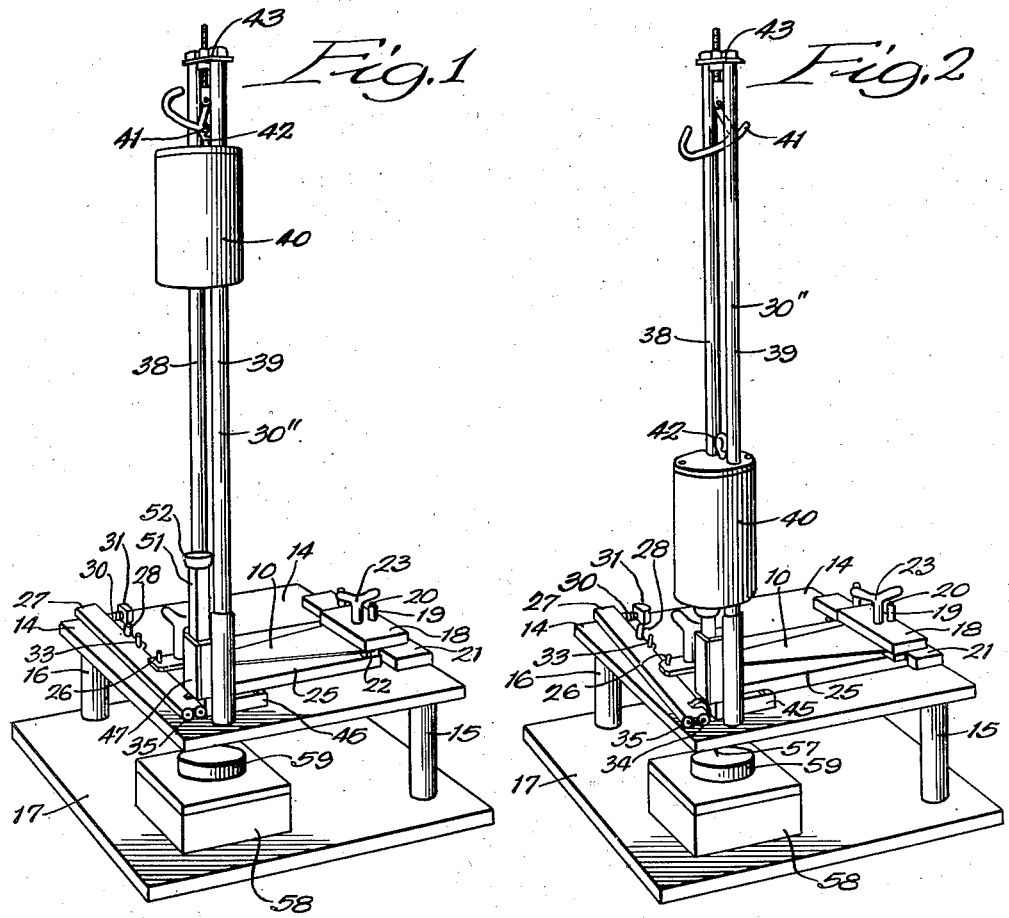
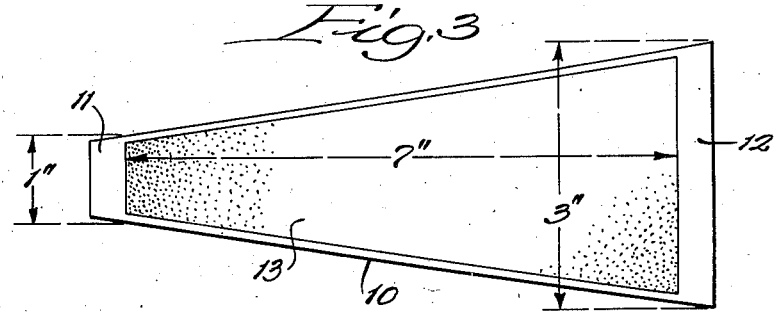
Inventor:
Johannes A. Van den Akker,
By Soans, Pond & Anderson,
Attorneys.

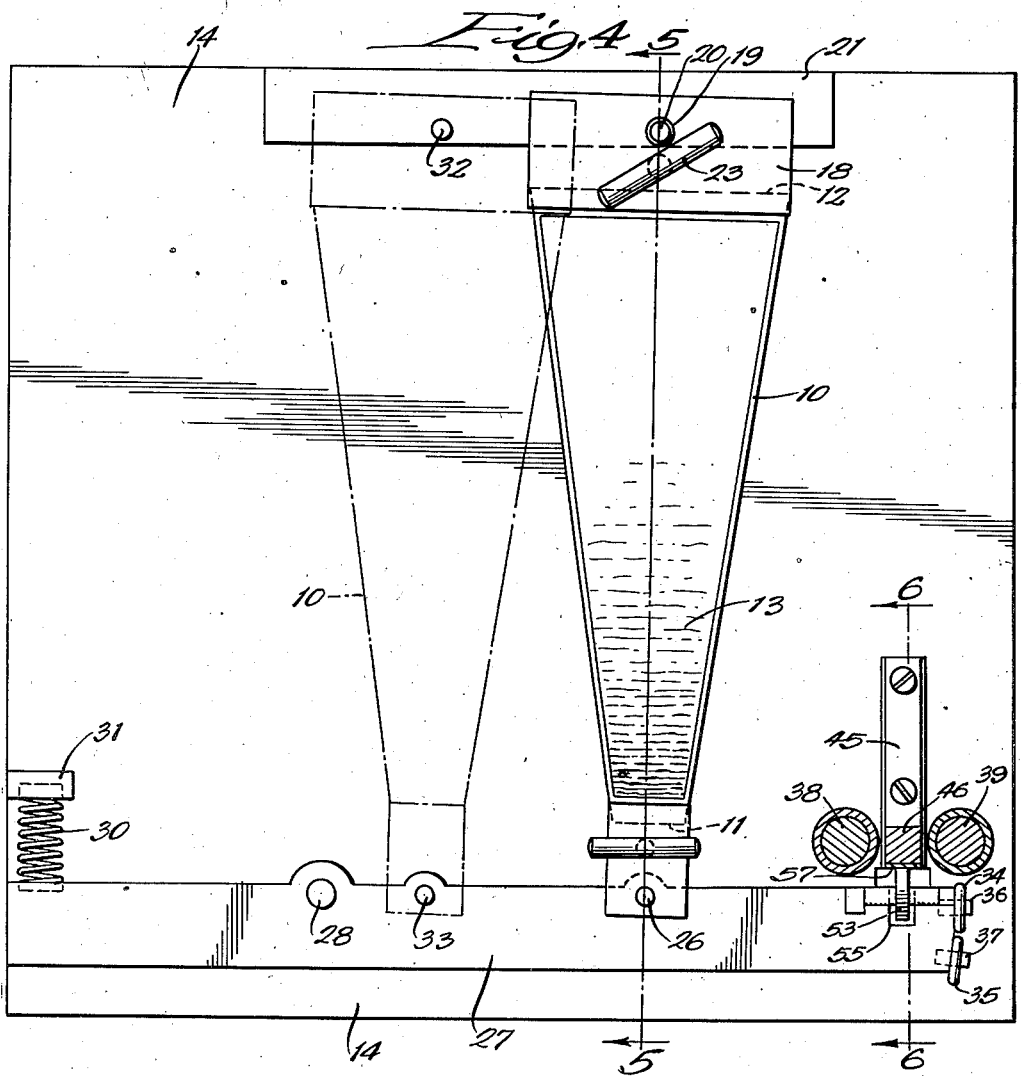

Dec. 28, 1948. J. A. VAN DEN AKKER 2,457,788
FILM EXTENSIBILITY TESTING METHOD AND APPARATUS
Filed Sept. 29, 1945 3 Sheets-Sheet 3
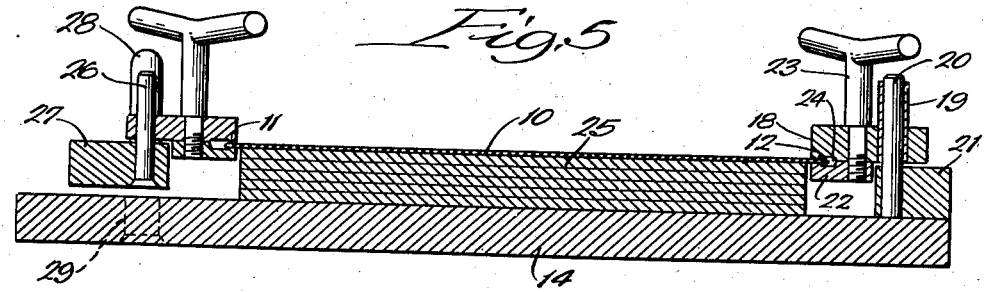
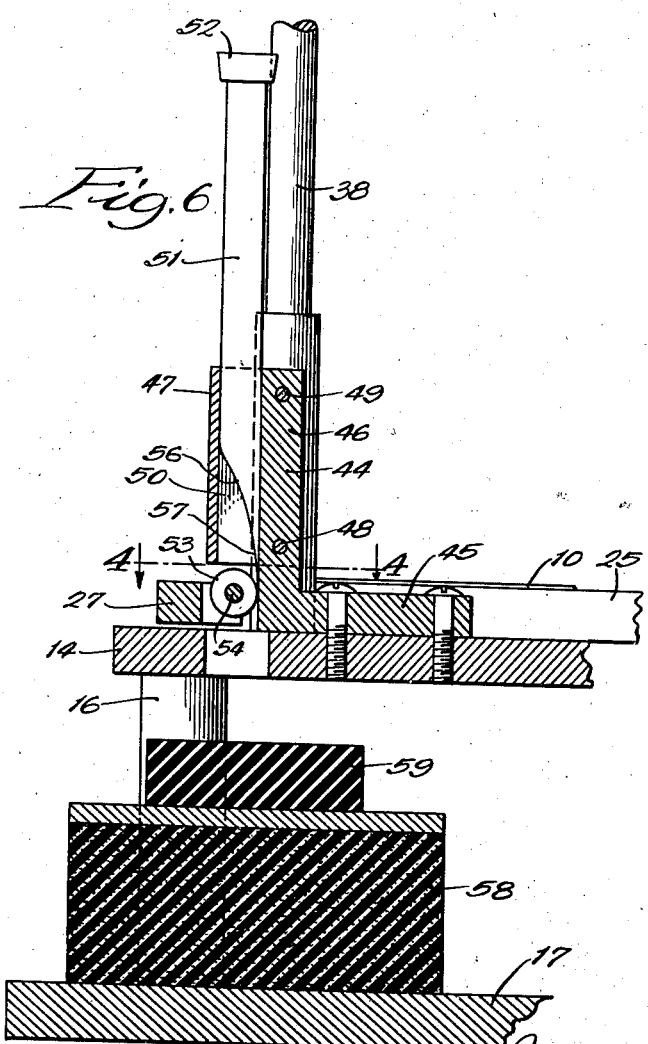
Inventor:
Johannes A. Van den Akker,
By Soans, Pond + Anderson,
Attorneys.

Patented Dec. 28, 1948

2,457,788

UNITED STATES PATENT OFFICE 2,457,788

FILM EXTENSIBILITY TESTING METHOD AND APPARATUS

Johannes A. Van den Akker, Appleton, Wis., assignor, by mesne assignments, to the United States of America as represented by the Secretary of War Application September 29, 1945, Serial No. 619,387

9 Claims. (Cl. 73—150)

The invention relates to improvements in film extensibility testing methods and apparatus and is of particular value in connection with the testing of films of material which may be applied as liquids to form coatings for protecting or ornamenting the surfaces of various articles or structures, or which may be used as adhesives or cementing agents.

So far as I am aware, no entirely satisfactory method has yet been devised for testing the extensibility of coatings of paint or laquer, although the extensibility of such coatings is a very important consideration in determining the efficiency or adaptability of such a coating when applied to an article which is subject to bending or other circumstances which tend to stretch such coating. Obviously if the coating which is applied to an article for the purpose of protecting the same against atmospheric or other degenerative tendencies is too brittle or so inelastic that it will be fractured when the supporting surface is itself deformed or stretched, the coating thereupon loses its usefulness as a protection to the surface of the article to which it is applied. Therefore, it is important to determine whether such a film will withstand the abuse to which it later may be subjected in actual service.

In addition to the desirability of being able to test the extensibility of such a film or coating when subjected to a sustained or gradually applied destructive force, it is desirable also to be able to determine the extent to which the film will resist a force which is suddenly applied, i. e., the resistance of the film to shock. So far as I am informed, this problem also has been unsolved.

The object, therefore, of the invention is to provide a simple, convenient and efficient method and apparatus by which the ability of a filmmaking material or cementing agent to withstand the before recited conditions of stress or abuse can be predicted with reasonable accuracy.

In the drawings accompanying this application, I have disclosed one type of apparatus which has been successfully used in carrying out the improved method. In said drawings:

Fig. 1 is a perspective view of the apparatus with the test weight in raised position;

Fig. 2 is a similar perspective view after the weight has been droped to make the test;

Fig. 3 is an enlarged plan view of the sample of material to be tested and supported on the test sheet;

Fig. 4 is an enlarged sectional plan view of a portion of the apparatus showing the test piece in position after the test;

Fig. 5 is a section taken on the lines 5—5 of Fig. 4; and

Fig. 6 is a section taken on the line 6—6 of Fig. 4.

The material to be tested in accordance with my improved method, which material may be in the present instance paint, lacquer, adhesive, or other similar material adapted to be applied as a liquid coating, is spread in the form of a thin film, for example of about .002 inch in thickness when dried, upon the surface of one side of a basesheet of soft rubber or similar extensible material having a thickness many times that of the film, for example about $\tfrac{1}{16}$ of an inch, and of a trapezoidal shape. I have had good success with a rubber testpiece having a Pusey & Jones plastometer reading of about 100 with a ⅛" ball and in the form of a sheet about 7 inches in length and having a major width at one end of 3 inches and a minor width at the other end of about 1 inch, said material having extensions at the ends in order to permit it to be fastened in suitable clamps to which tension may be applied. The film or coating may cover the entire surface of one side of the trapezoidal test zone of the base sheet, although preferably a slight margin may be provided, as shown in Fig. 3 of the drawings.

It will be manifest that, when a predetermined amount of tensile force is applied to the test piece 10 by means of clamps which are applied to the ends 11 and 12 of the sheet or base, the amount of stretch per unit of length of the test piece in the trapezoidal test zone will vary inversely in accordance with the cross section or width of the base at any particular point in said test zone. It will be understood that the film 13 which is being tested is so thin compared with the thickness of the base 10 that the percentage of experimental error due to the presence of the film on the test base 12 is quite insignificant, and in any case such error, if it exists, can be virtually eliminated, if the force applied to the test piece is adjusted so as to give a definite linear extension to the test base regardless of the extensibility or elasticity of the base.

When the base sheet has been stretched or extended so as to increase its length a definite amount, the film will be correspondingly stretched, so that the amount of its extension per unit length will be the same as that in the trapezoidal base piece 12 at the same point. Thus the amount of strain in the film at any point in the test zone will vary inversely in accordance with the cross sectional area or width of the base at that particular point in the test zone.

If the film is so elastic or extensible that it will withstand the maximum stress to which it is subjected at the narrowest point of the test zone, no cracks or fractures will develop in the surface of the film. However, if the film cannot resist such an amount of stress at any point in its length, cracks or fractures will develop, so that the elasticity or extensibility of the material of which the film is composed can be ascertained by measuring the distance from the large end of the test zone to the point where the first crack or fracture is observed.

If desired, a permanent record of the test may be made by dusting upon the film, when in stretched condition, a fine powder of color contrasting with the color of the film, so that, when the tension is released, some of the particles of the powder will be retained in the fractures on the surface of the film and will be visible, notwithstanding the return of the test sheet to its normal length and the consequent closing up of said cracks or fissures in the film.

Referring again to the drawings, it will be seen that the test base or sheet 10 is supported in a pair of clamps the large end 12 of the test sheet being secured in a stationary clamp, whereas the smaller end 11 of the test sheet is supported in a movable clamp by which the force for stretching the sample may be applied. Said parts are supported by a main base plate 14 which, by means of corner posts such as 15 and 16, is supported in raised position over a sub-base 17.

The clamp which secures the end 12 of the base piece comprises an upper block 18 which is made with a bearing 19 surrounding a pin or stud 20 fixed in a bar 21, suitably secured to the back of base plate 14. The purpose of the bearing 19—20 is to enable the base sheet 10 to accommodate itself to any inaccuracy involved in the application of the clamp to the sheet, so that the force which is applied will be centrally applied and accurately balanced as to each side edge of the test piece. The lower jaw 22 of the clamp is drawn into contact with the end 12 of the test sheet by means of a wing screw 23 threaded into said lower jaw 22. In order to insure that the sheet will be clamped in a narrow line or zone extending the entire distance across the end 12 of the test piece, it is advisable to provide one or both of the abutting faces of the block 18 and jaw 22 with a recess 24.

The test sheet 10 is preferably not allowed to sustain itself against the action of gravity, but is supported in the plane of the jaws of the clamps by means of a piece of smooth faced wood or other suitable material 25 of the required thickness. The clamp for the small end of the test piece is of construction similar to that for the large end and is pivoted on a hinge pin or pivot 26 which is secured in a swinging lever 27 through which tensile force is actually applied to the test sheet. Said swinging lever 27 is pivoted upon a stout stud or pin 28, the lower end of which is mounted rigidly in the base plate 14, as indicated at 29. As shown in Fig. 4, the lever 27 is normally urged in a direction to return said lever to its normal unstressed condition by means of a relatively light coil compression spring 30 which is interposed between the side of the lever and a small block 31 fixed to the top side of the base plate 14.

Preferably, the apparatus is organized to arrange for different amounts of extension of the test pieces, even though the lever 27 is subjected to a constant predetermined amount of angular movement. This is effected by having two positions for the test piece. As shown in dotted lines in Fig. 4, the test piece can be shifted closer to the pivot 28 by using pivot pins 32 and 33 for the clamps at the large and small end of the test piece, respectively, instead of using the regular pivots 20 and 26.

The longer end of the lever 27 is maintained in its proper horizontal plane by means of a pair of small rollers 34 and 35 mounted on pins 36 and 37, respectively, inserted in the end of the lever 27 and coaxial with a radius passing through the axis of lever pivot 28. Said rollers 34 and 35 are of the proper diameter to engage the upper surface of the base plate 14 and thereby prevent the outer end of the lever 14 from sagging when any downward pressure is applied thereto.

The test force which effects a predetermined amount of movement of the longer end of the lever 27 is applied through the following mechanism:

Near the outer end of the lever 27 and in the base plate 14 there are positioned a pair of circular upstanding rods or standards 38 and 39. Said rods or standards 38 and 39 function as guides for the vertical sliding movement of a ten pound cylindrical weight 40 (see Figs. 1 and 2) which is bored out to freely and slidably accommodate said standards 38 and 39. The standards 38 and 39 are long enough to allow a sliding movement of about 10 inches for the weight 40, and said weight 40 may be held in its upper position, as shown in Fig. 1, by means of a swinging hook having a projection 41 adapted to enter an eye 42 rigidly secured in the upper face of the weight 40. Said hook is swung on a small bolt carried by a yoke 43 which unites the upper ends of the standards 38 and 39.

As shown best in Figs. 4 and 6, there is located between the bases of the standards 38 and 39, an L-shaped block 44, the lower horizontal limb 45 of which is bolted to the top of the plate 14. To the upstanding leg 46 of said L-shaped piece, there is secured a U-shaped casing or housing 47 by means of bolts or rivets 48 and 49 which extend through the sides or arms 50 of said U-shaped piece. The middle or yoke part 47 of said U-shaped casing is spaced from the upstanding limb 46 a sufficient distance to form a guide for plunger 51 which slides in the space between said parts 46 and 47. The upper end of said plunger 51 is equipped with a lead cap 52, the purpose of which is to prevent bouncing or other improper action when the weight 40 is dropped upon the end of said plunger 51.

As shown in Fig. 6, the front edge or face of the vertical leg 46 forms a stop against which the action of the spring 30 on the lever 27 normally tends to force the periphery of a roller 53 which is mounted to rotate upon a small axle or pin 54 carried in the end of the lever 27. The end of said lever 27 is slotted, as shown at 55, in order to accommodate said roller 53. The roller 53, which is 9/16" in diameter, is so located on the pin 54 that its center will be alined with the center of the housing 47 and plunger 51. As shown in Fig. 6, the lower end of said plunger 51 is made with a cam surface 56 which terminates in a feather edge, as shown at 57.

From an examination of the drawings, it will be readily observed that, when the weight 40 is released from its position at the top of the standards, as shown in Fig. 1, it will slide vertically down the standards 38 and 39, in this case about eight inches, and the lower face of the weight will then strike the cap 52, driving down the plunger 51 and thereby causing the cam surface 56 on the lower end of the plunger to engage the periphery of roller 53. The entry of the cam-profiled member 56 between the roller 53 and the block 44 will force said roller away from the U-shaped block 44 and thereby swing the end of the lever outwardly, compressing the spring 30 and stretching the test piece mounted between the end clamps. The amount of elongation of the resilient test piece will be controlled by the front to back dimension of the plunger 51, in this case ½", in view of the fact that the foot-pounds of energy developed by the fall of the weight 40 are more than sufficient to drive the plunger down to a point where the roller 53 will ride off the cam and onto the vertical face of said plunger 51. Preferably, the movement of the plunger 51 is arrested shortly after this condition occurs, i. e. after the lever 27 has been moved its prescribed maximum amount. Such arresting of the movement of plunger 51 is effected by providing on the sub base 17 a cushion block 58 upon which is placed a thick pad 59 of rubber or similar resilient material which will receive the impact of the feather edge 57 of the plunger 51.

If the device is to be employed for merely comparing the resilience or extensibility of films under static conditions or conditions where the load or stress is gradually applied, the pressure upon the plunger 51 may be applied gradually by hand or otherwise without the necessity of employing a falling weight 40, and in that case the exact shape of the cam surface 56 is not particularly important. However, if it is desired to ascertain the ability of the film to resist shock or suddenly applied disruptive forces, the cam 56 may be made of such length and shape that there will be a uniform acceleration of the angular velocity of the lever 27 around its pivot through a predetermined interval of time during which the test force is applied. Obviously, this will require a cam-slope the surface of which increases in curvature as the plunger descends. (See Fig. 6.)

In the present case, when the time interval required to shift the roller 53 a distance of about ½" is preferably about a fiftieth part of a second, a cam length of about 2" is required. The shape of the cam surface is that of the outer circumference of the path swept out by the ⁹⁄₁₆" diameter roller 53 when its center moves along the path $S = 0.203Y^2$, where $S$ is the horizontal displacement of the roller and $Y$ is the vertical displacement of the plunger.

I claim:

1. A method of ascertaining the extensibility of a film of paint, lacquer, adhesive, or similar material, which comprises applying a relatively thin film of said material to the surface of a relatively thick extensible base having ends to which tension may be applied and having a tapering cross section in a zone between said ends, and applying to said base through said ends a force adapted to effect a predetermined amount of extension of said base within its elastic limit, whereby said film at different points in said zone is subjected to an amount of pull per unit of its cross sectional area at any of said points which varies inversely in accordance with the cross section of the base at said point, and whereby said film may be caused to develop transverse fractures at points of inferior cross section in said zone while elsewhere maintaining its integrity.

2. A method of ascertaining the extensibility of a film of paint, lacquer, adhesive, or similar material, which comprises anchoring a relatively thin film of said material to one side of a length of relatively thicker but resilient readily-extensible base sheet of uniform thickness having ends to which tension may be applied and of a width which tapers in a zone between said ends, and applying to said base through said ends a force adapted to effect a predetermined amount of extension of said base, without fracturing the base, whereby said film at different points in said zone is subjected to an amount of pull per unit of its cross sectional area at any of said points which varies inversely in accordance with the width of the base at said point, and whereby said film may be caused to develop visible transverse fractures at points of inferior width in said zone while maintaining its integrity at other points in said zone where the width of the base sheet is greater.

3. A method of ascertaining the extensibility of a film of paint, lacquer, adhesive, or similar material, which comprises applying a relatively thin film of said material to the surface of a relatively thick but resilient and readily extensible base having ends to which tension may be applied and having a tapering cross section in a zone between said ends, and applying to said base through said ends a force adapted to effect progressively, during a predetermined time interval, a predetermined amount of extension of said base without fracturing the base whereby said film at different points in said zone is subjected to an amount of pull per unit of its cross sectional area which varies inversely in accordance with the cross section of the base at said point, and whereby said film may be caused to develop transverse fractures at points of inferior cross section in said zone while elsewhere maintaining its integrity.

4. A testing apparatus comprising the combination of an elongated base strip of tapered cross-section consisting of extensible material on which a product to be tested may be applied as a film, clamps respectively engaging with opposite ends of said strip, traction means for separating said clamp for the lengthwise extension of said strip and means for controlling the amount of separation of said clamps.

5. An apparatus for determining the extensibility of paint-like films comprising the combination of an elongated base strip of tapered cross section consisting of rubber on which a film of coating material may be applied, clamps respectively engaging with opposite ends of said strip, means for horizontally sustaining said strip against gravity, traction means for separating said end clamps whereby said strip and the applied film is stretched, and means for controlling the extent of said stretch.

6. A testing apparatus comprising the combination of an extensible support strip for testing the extensibility of films which may be coated thereon, said strip having linear variation in extensibility, cooperating clamps respectively for the extremities of said strip, one of said clamps being movable, and means for extending said sheet, said means comprising a lever engaging with the aforesaid movable clamp, a cam-profiled member, and trigger-operated means for causing said cam member to move said lever in accordance with the shape of the cam profile on said member, thereby causing said base strip to be extended accordingly.

7. A testing apparatus comprising the combination of an elongated base strip of resilient sheet material of tapered cross-section which may be extended sufficiently to significantly stretch a film of coating material applied thereon, cooperating clamps engaging with opposite ends of said strip, supports for said clamps located in spaced positions, and means for stretching said base strip and thereby straining said film at a controlled rate, said means including a member having a cam surface thereon, means for supporting said member in an initial position adjacent to but non-engaging with one of said clamps, said member being movable from said initial position to a second position during which engagement of said cam surface with one of said clamp supports will cause said base strip to be extended in accordance with the shape of said cam surface to determine the extensibility of a film coated thereon.

8. A film testing apparatus comprising the combination of a frame providing a normally horizontal support, cooperating clamps spaced apart on said frame, one of said clamps being fixed and another of said clamps being movable, a tapering sheet of extensible material of substantially uniform thickness and tapered width on which films to be tested may be applied, said sheet resting on said frame and being connected at opposite ends to said clamps, a crossbar connected to said movable clamp and being movably mounted on a pivot adjacent said clamp, a spring at one end of said cross bar urging said bar toward said clamp, and means connected to the opposite end of said cross bar for moving the same a predetermined distance whereby said movable clamp is moved to extend said resilient base support together with a film applied thereto, said means including a movable plunger having a cam-shaped surface, a weight engaging with said plunger, a vertical mount slidably engaging with said weight and a trigger mechanism for releasing said weight to drive said plunger into engagement with said cross bar.

9. A film testing apparatus comprising the combination of an elongated resilient base strip having definite linear variation of extensibility, cooperating clamps, one of which is movable, respectively engaging with opposite ends of said strip, a pivoted lever attached to said movable member, a support for an end of said lever normally maintaining said strip unextended between said clamps, and traction means for moving said lever and separating said clamps, thereby elongating said strip a predetermined distance, said means comprising a cam member engaging with said lever, the shape of said cam member being chosen to move said lever a distance approximating ½ inch and a guide wherein said cam-shaped member may be forcibly driven to exert a wedging force separating the movable end of said lever from said support for suddenly extending said base strip and a film coated thereon.

JOHANNES A. VAN DEN AKKER.

REFERENCES CITED

The following references are of record in the file of this patent:

UNITED STATES PATENTS

| Number | Name | Date |
|---|---|---|
| 2,339,855 | Hodil et al. | Jan. 25, 1944 |
| 2,310,845 | Ellis | Feb. 9, 1943 |

OTHER REFERENCES

Circular No. 240 of the Scientific Section of Paint Manufacturer's Assn. of the U. S. Issued June 1925; pgs. 308 to 313. (Copy in Div. 36, U. S. Pat. Office.)

Circular No. 274 of the Scientific Section of Paint Manufacturer's Association of the U. S. Issued June 1926, pgs. 61 to 70.